S. ELMEN.
DRAGGING AND HARROWING APPARATUS.
APPLICATION FILED OCT. 23, 1915.
1,198,118.
Patented Sept. 12, 1916.
2 SHEETS—SHEET 1.
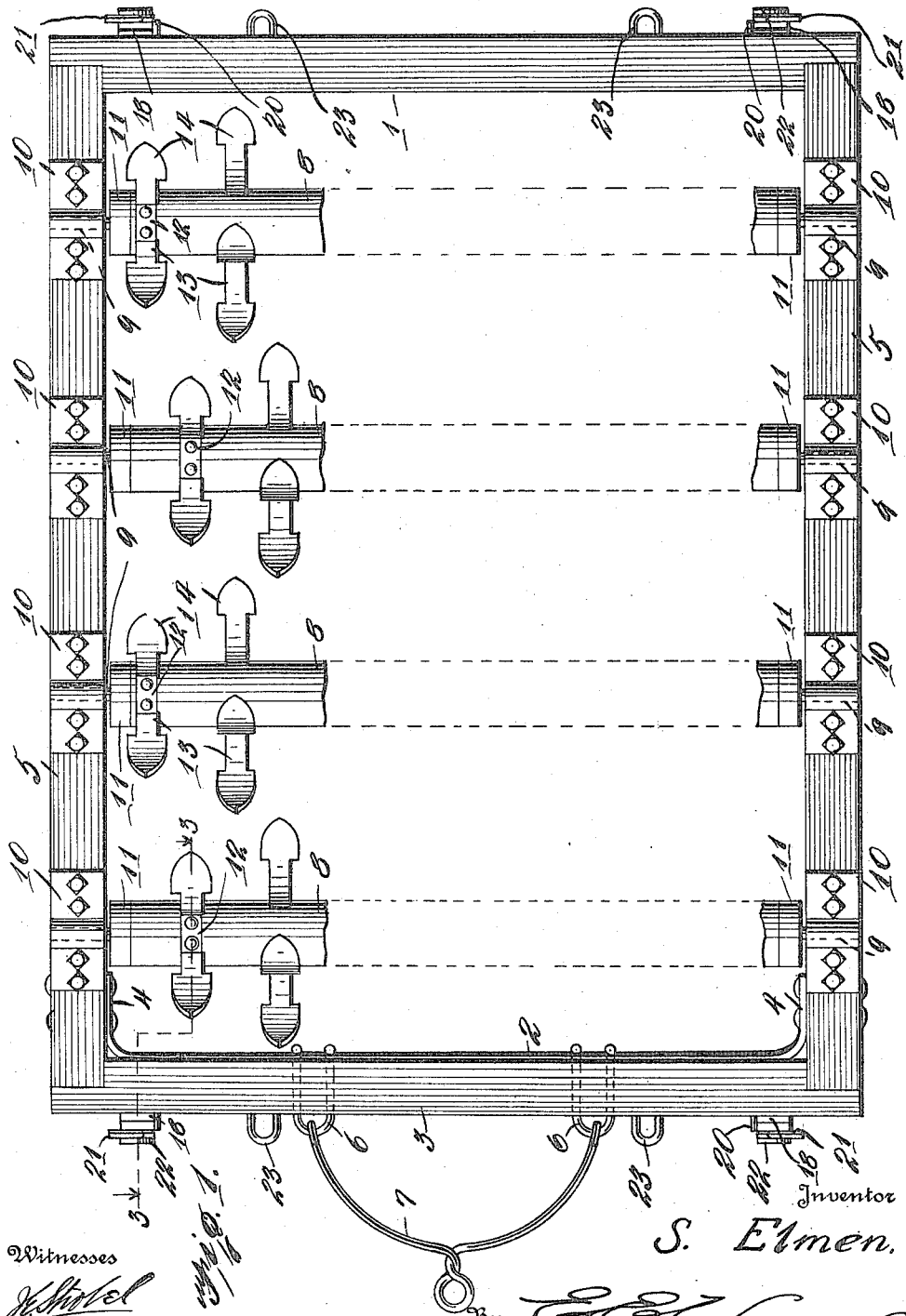
Witnesses
Inventor
S. Elmen.
By
his Attorneys

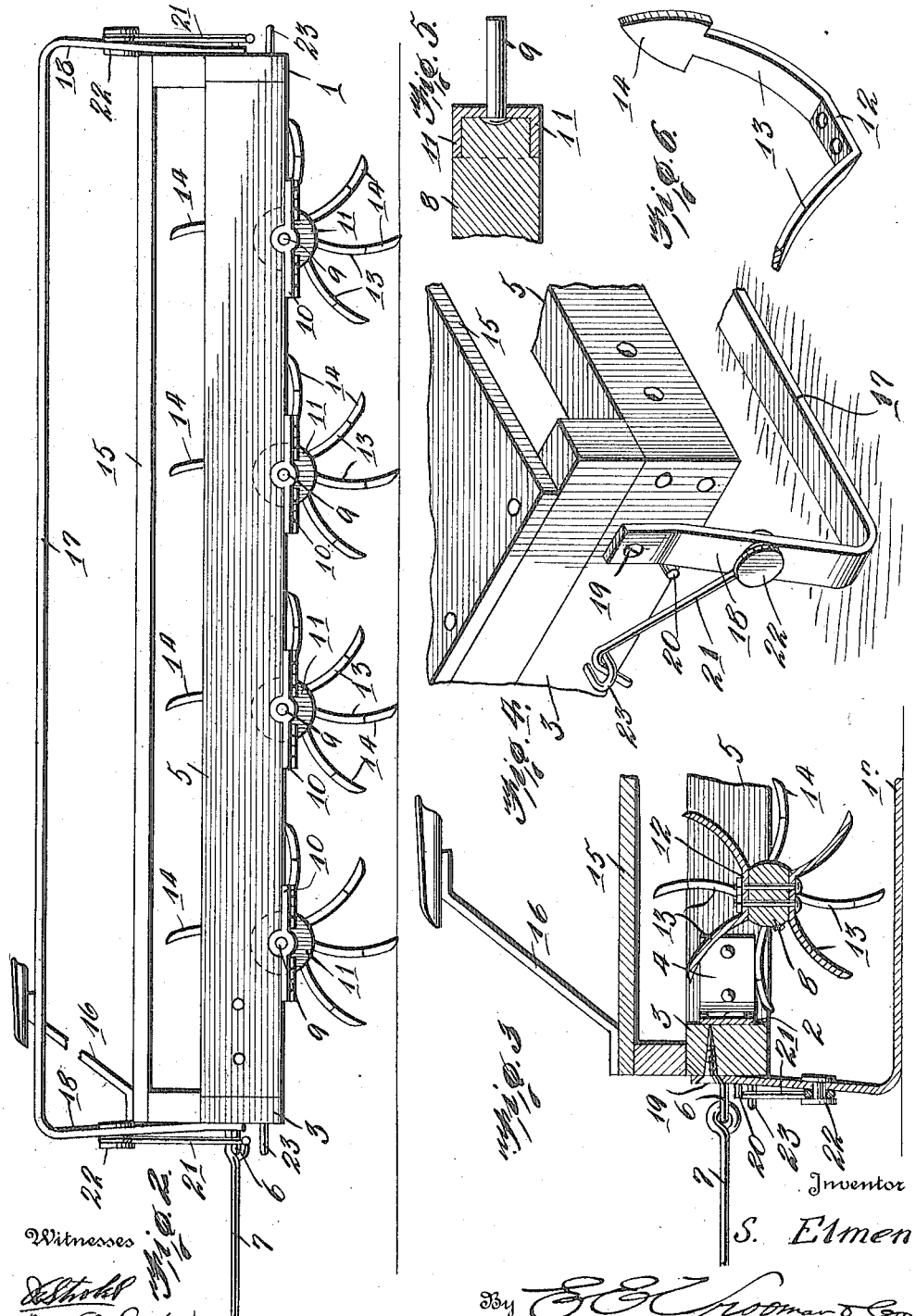

UNITED STATES PATENT OFFICE.

SAMUEL ELMEN, OF RED LODGE, MONTANA.

DRAGGING AND HARROWING APPARATUS.

1,198,118.　　　　　Specification of Letters Patent.　　Patented Sept. 12, 1916.

Application filed October 23, 1915. Serial No. 57,572.

*To all whom it may concern:*

Be it known that I, SAMUEL ELMEN, a citizen of the United States of America, residing at Red Lodge, in the county of Carbon and State of Montana, have invented certain new and useful Improvements in Dragging and Harrowing Apparatus, of which the following is a specification, reference being had therein to the accompanying drawing.

This invention relates to a dragging and harrowing apparatus and has for its object the production of a simple and efficient harrow which will efficiently harrow the ground over which the same is dragged and may at the same time be conveniently transported from place to place.

Another object of this invention is the production of a simple and efficient means for supporting the harrow frame above the harrow blades while conveying the harrow from place to place or from one field to another.

With these and other objects in view, this invention consists of certain novel combinations, constructions, and arrangements of parts as will be hereinafter fully described and claimed.

In the accompanying drawings: Figure 1 is a bottom plan view of the harrow. Fig. 2 is a side elevation of the harrow. Fig. 3 is a section taken on line 3—3 of Fig. 1. Fig. 4 is a detailed perspective of one end of the harrow frame showing the manner in which the runner is supported for transporting the harrow frame from place to place. Fig. 5 is a longitudinal section through one end of one of the harrow rollers. Fig. 6 is a detailed perspective of a portion of one of the harrow blades.

Referring to the accompanying drawings by numerals it will be seen that 1 designates the frame of the harrow which is preferably rectangular in shape as illustrated in Fig. 1, although of course the device may be made in any shape or proportion without departing from the spirit of the invention. A bracing plate 2 is secured to the rear face of the front beam 3 and is provided with a pair of rearwardly extending feet 4 which feet 4 are secured to the inner faces of the side rails 5. A pair of yoke members 6 are secured to the front beam 3 and have their rear ends bent over the rear face of the bracing plate 2 as illustrated in Fig. 1 of the drawings. A draft bar 7 is secured to the yoke member 6 as illustrated in Fig. 1 to permit the attachment of draft animals to the harrow frame 1. A plurality of harrow rollers 8 are journaled upon the side rails 5 and have their projecting end stub shafts 9 journaled in the journal boxes 10. The stub shafts 9 are secured to the harrow rollers 8 by means of the metallic caps 11 which fit over the ends of the rollers 8 as illustrated clearly in the drawings. A plurality of harrow shovels 12 are secured to the rollers 8 and each of these shovels 12 comprises a pair of radiating arms 13 carrying shovel blades 14 upon the outer ends thereof. The harrow shovels 12 are placed upon the rollers 8 so as to have each alternate pair of shovel members extending at right angles to each other, as clearly illustrated in Fig. 3. By carefully considering Figs. 2 and 6 it will be seen that the shovel blades 14 will be allowed to efficiently dig into the surface over which the harrow is being drawn. A platform 15 is supported upon the frame 1 and a seat 16 of suitable construction is also supported upon the platform 15. It of course should be understood that any desired weight may be placed upon the platform 15 if such a weight should be necessary for facilitating the harrowing of the ground over which the device is passing. A runner 17 is carried upon each side of the frame 1 and each runner 17 is provided with end arms 18 which arms 18 are pivotally secured to the frame 1 by means of pivot bolts 19. The runners 17 are normally swung upwardly so as to overhang the platform 15 but when it is desired to convey the harrow from one field to another, the runners 17 are swung downwardly to the position shown in Fig. 4, thereby raising the harrow plow blades to the position shown in Fig. 3 and out of engagement with the ground over which the device is passing. A stop pin 20 is carried adjacent each pivot bolt 19 and is adapted to limit the inward swinging movement of the runners 17 after the same have been thrown to a downward position. A bracing hook 21 is pivotally secured to each of the arms 18 of the runners 17 by means of a pivot bolt 22, and these hooks 21 are adapted to engage the eyes 23 carried by the frame 1 and limit the outward swinging movement of the runners 17 for holding the runners in a braced position for supporting the harrow frame 1.

From the foregoing description it will be seen that a very simple and efficient means has been produced for conveniently supporting a harrow frame for permitting the frame to be easily conveyed from one field to another and at the same time permitting the harrow blades to be easily thrown into an operative position by swinging the runners 17 upwardly so as to overhang the platform 15 and be out of the way when the runners 17 are not in use.

What I claim is:—

1. A harrow of the class described comprising a frame, said frame comprising a pair of side rails, a front and a rear rail, a bracing plate secured to the rear face of said front rail and provided with rearwardly extending ends, means for securing said ends to said side rails, and draft means passing through said front rail and engaging said bracing plate, and harrow means carried by said frame.

2. A harrow of the class described comprising a frame, said frame comprising a pair of side rails, a front and a rear rail, a bracing plate secured to the rear face of said front rail and provided with rearwardly extending ends, means for securing said ends to said side rails, draft means passing through said front rail and engaging said bracing plate, harrow means carried by said frame, and a platform supported upon said frame and entirely overhanging said frame.

In testimony whereof I hereunto affix my signature.

SAMUEL ELMEN.

Copies of this patent may be obtained for five cents each, by addressing the "Commissioner of Patents, Washington, D. C."